United States Patent [19]
Altidor et al.

[11] Patent Number: 5,894,276
[45] Date of Patent: Apr. 13, 1999

[54] COMMUNICATION DEVICE WITH PROGRAMMABLE FUNCTION BUTTON AND METHOD OF OPERATION

[75] Inventors: Wilker Altidor, Coral Springs; Hugue Leger, Lauderhill, both of Fla.

[73] Assignee: Motorola, Inc., Schaumburg, Ill.

[21] Appl. No.: 08/780,036

[22] Filed: Dec. 23, 1996

[51] Int. Cl.$^6$ ........................................ H04Q 7/32
[52] U.S. Cl. .................. 340/825.22; 340/825.69; 455/186.2; 341/34; 200/19 R; 369/33; 345/169; 345/172
[58] Field of Search .............. 340/825.22, 825.72, 340/825.57, 825, 825.62, 825.69, 825.71; 348/734; 455/186.1, 91, 95, 186.2, 90, 575; 341/176, 22, 173, 34; 200/2, 175, 19 R; 367/197; 369/24, 30, 33; 1/1; 345/169, 172

[56] References Cited

U.S. PATENT DOCUMENTS

| | | | |
|---|---|---|---|
| 4,585,908 | 4/1986 | Smith | 179/81 C |
| 4,786,895 | 11/1988 | Castaneda | 340/709 |
| 5,201,068 | 4/1993 | Kawashima | 455/575 |
| 5,237,327 | 8/1993 | Saitoh et al. | 340/825.72 X |
| 5,317,403 | 5/1994 | Keenan | 348/734 X |
| 5,386,084 | 1/1995 | Risko | 455/90 X |
| 5,436,676 | 7/1995 | Pint et al. | 348/734 |
| 5,436,954 | 7/1995 | Nishiyama et al. | 455/90 X |
| 5,563,631 | 10/1996 | Masunaga | 345/169 |
| 5,710,987 | 1/1998 | Paulick | 455/90 |
| 5,724,069 | 3/1998 | Chen | 345/172 |

Primary Examiner—Brian Zimmerman
Assistant Examiner—William H. Wilson, Jr.
Attorney, Agent, or Firm—Andrew S. Fuller

[57] ABSTRACT

A communication device (100) incorporates a programmable function button (105) that operates in conjunction with a display (102). The button (105) operates in an execution mode when engaged for a time period less than a particular threshold (310, 320, 330, 340), and operates in a programming mode when continuously engaged for a time period greater than the threshold (310, 320, 330, 350). In the execution mode, the button causes execution of a preprogrammed function (340). When in the programming mode, continuous engagement of the button causes a successive presentation of a selectable programmable function on the display (410, 420, 430), and disengagement of the button automatically results in the button being programmed with the selectable programmable function (440, 450). Preferably, release of the button, when in programming mode, also causes automatic execution of the selectable programmable function (460).

17 Claims, 5 Drawing Sheets

100 ived 5,894,276

COMMUNICATION DEVICE WITH PROGRAMMABLE FUNCTION BUTTON AND METHOD OF OPERATION

TECHNICAL FIELD

This invention relates in general to communication device, and more particularly, to control interfaces for communication devices.

BACKGROUND OF THE INVENTION

Communication devices, such as portable radios or cellular telephones, often include a display for presenting user information, and control buttons to facilitate device operations. A communication device may further include a customizable or programmable function button, that can be associated with an important or frequently used function. The prior art includes a variety of options for customizing programmable function buttons. In one approach, a button is customized using programming equipment that interfaces with the communication device. This approach is common for two-way portable radios. In another approach, a function button is programmable by manipulation of a keypad on a control interface. One such example is described in U.S. Pat. No. 4,585,908, issued to Smith on Apr. 29, 1986, for a Data Entry and Display Control Circuit. Here, a button has an execution mode and a programming mode. The programming mode is selected by depressing the button for a predetermined time. Once in programming mode, a keypad is used to enter data that may be associated with pre-assigned available features. Upon a subsequent depression of the programmable button the data entered is translated to assign an available feature to the button.

There has been an increased emphasis on providing control interfaces for communication devices that facilitate ease of operation. Generally, it is desirable to minimize the necessary user interaction to achieve a particular function. Prior art approaches to the customization of programmable function buttons do not provide sufficient ease of operation in certain applications. It is therefore desirable to provide a new approach for operating a programmable function button.

DETAILED DESCRIPTION OF THE PREFERRED EMBODIMENT

The present invention provides for a communication device that incorporates a programmable function button. The button operates in an execution mode when depressed or otherwise actuated for a time period less than a particular threshold, and operates in a programming mode when continuously depressed for a time period greater than the threshold. In the execution mode, the button causes execution of a preprogrammed function. When in the programming mode, continuous depression or engagement of the button causes a successive presentation of a selectable programmable function on the display, and release or subsequent disengagement of the button automatically results in the button being programmed with the selectable programmable function. Preferably, release of the button, when in programming mode, also causes automatic execution of the selectable programmable function. In an alternative embodiment, the button may be operated to traverse a hierarchical tree structure before the selectable programming functions are displayed.

Figure 1:
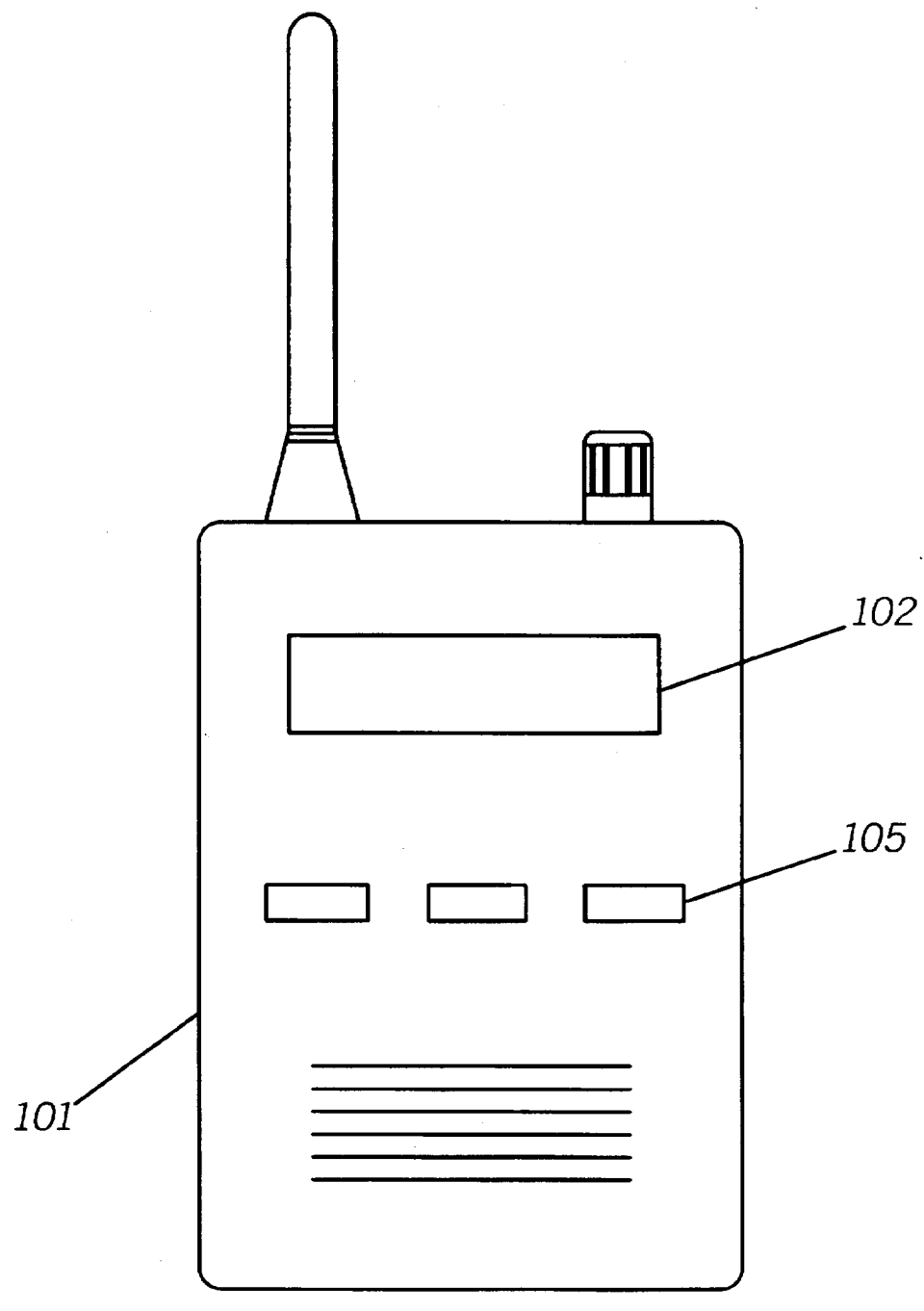
FIG. 1 is a front view of radio communication device, in accordance with the present invention.

Referring to FIG. 1, a front view of a radio communication device 100 is shown, in accordance with the present invention. The radio communication device 100 includes a device housing 101 which provides structural support for internal and external components. These components include a display 102, and a set of function buttons 105. The buttons 105 are operable in two actuation modes, depending upon the duration of actuation. When a button 105 is depressed or activated for a time period less than a threshold, such as three seconds, the button causes execution of a pre-programmed function assigned to that button. When the button is continuously activated for a time period greater than the threshold, the button causes successive presentation of a selectable option on the display, and subsequent deactivation of the button automatically results in activation of the selectable option. In a preferred embodiment, the selectable options represent available programmable functions. In an alternative embodiment, selectable options can include entries that are expandable into additional selectable options.

Figure 2:
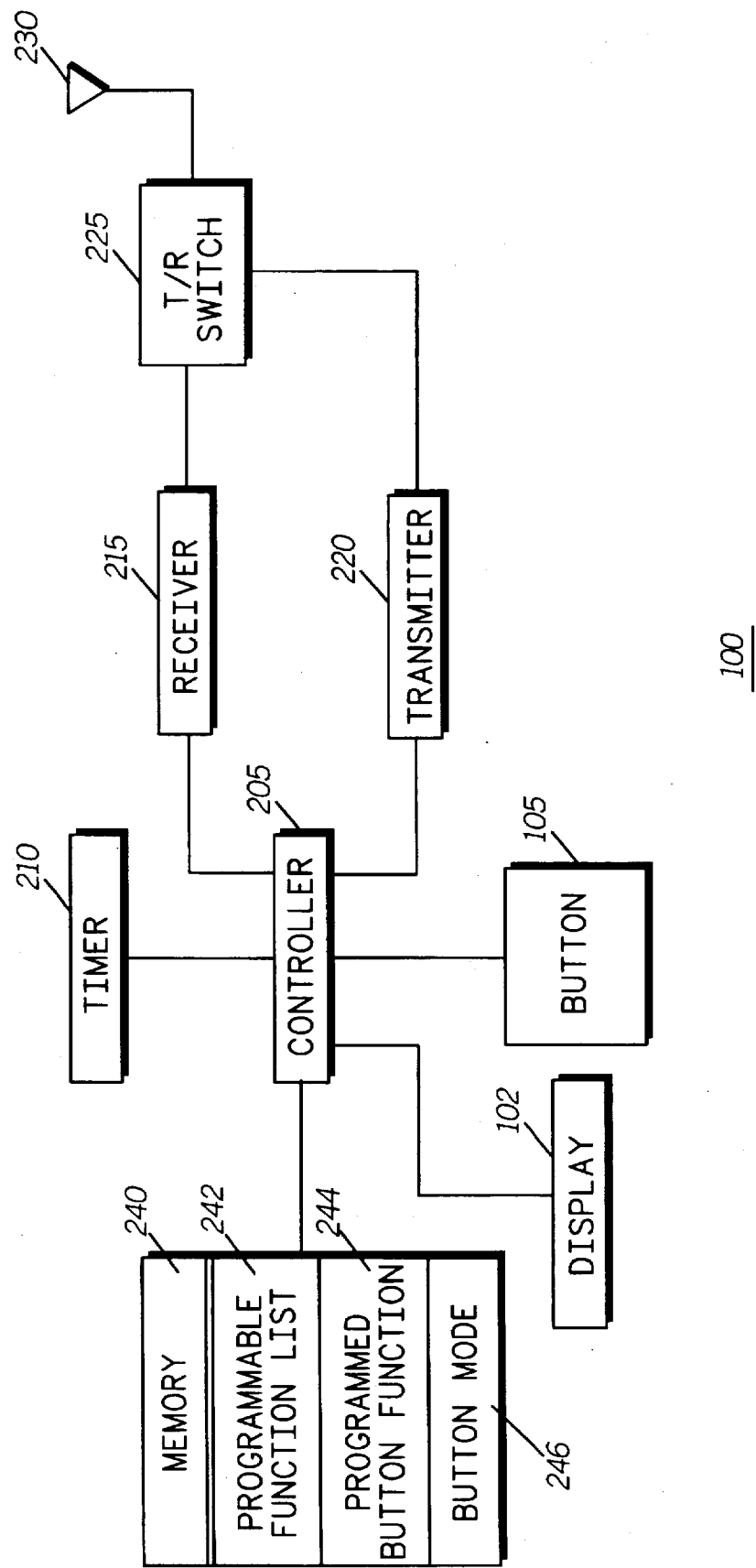
FIG. 2 is a block diagram of functional components of the radio communication device of FIG. 1.

FIG. 2 is a block diagram of the radio communication device 100, in accordance with the present invention. The radio communication device includes communication circuitry for communication over radio frequency channels. Accordingly, the radio communication device 100 includes a controller 205, a receiver 215, a transmitter 220, a transmit/receive switch 225, and an antenna 230. The radio communication device 100 is operable to perform receive and transmit operations. For receive operations, the transmit/receive switch 225 is operated to couple the receiver 215 to the antenna 230. Similarly, for transmit operations, the transmit/receive switch 225 is operated to couple the antenna 230 to the transmitter 220. Overall operational control is provided by the controller 205.

The controller also operates the display 102 and the programmable button 105, in accordance with the present invention. To support such operation, the radio communication device 100 includes a timer 210, and a non-volatile memory 240. The controller utilizes the timer to determine when to operate the button in execution mode or in programming mode. When in execution mode, the controller accesses a memory storage location 244 to retrieve and execute the pre-programmed button function. When in programming mode, the controller accesses memory location 242 to obtain a set of selectable options, such as a list of programmable functions. The mode status of the button is stored at memory location 246.

Figure 3:
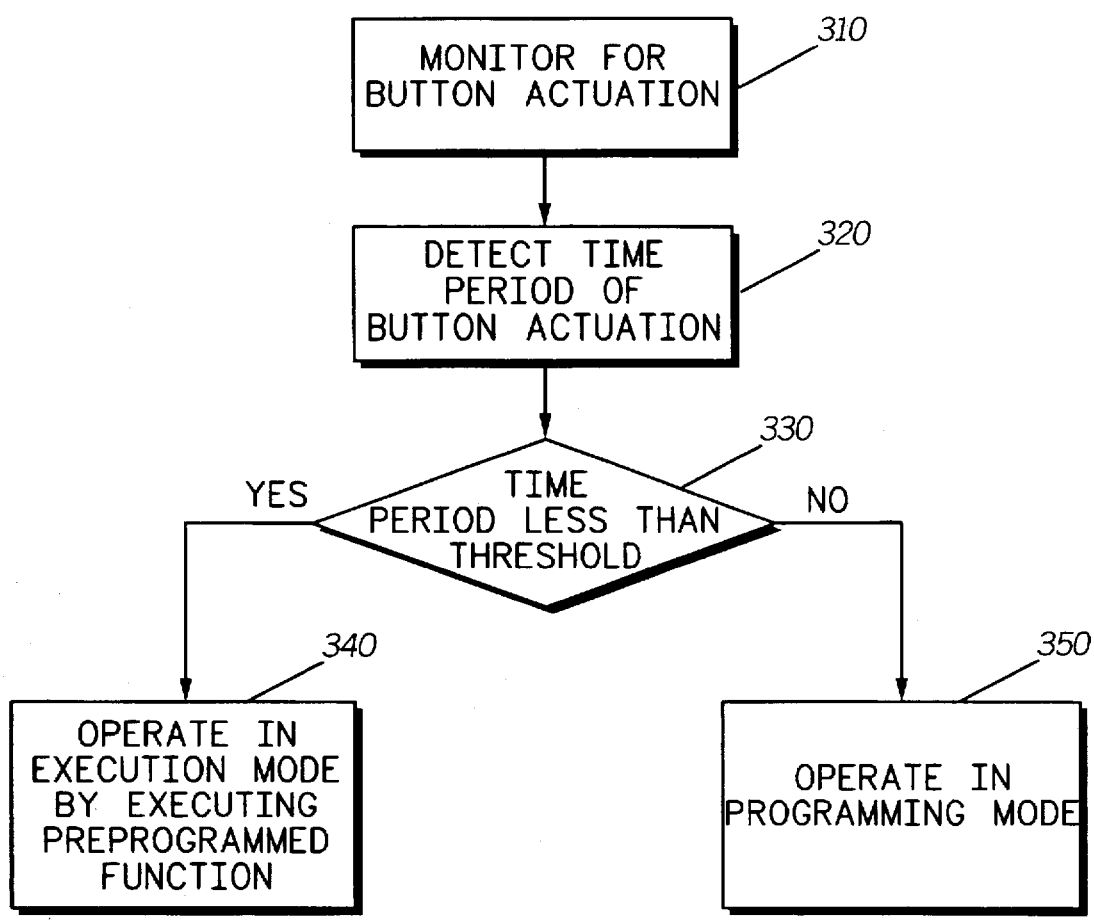
FIG. 3 is a flowchart of procedures for operating a programmable button, in accordance with the present invention.

FIG. 3 is a flowchart of procedures summarizing the steps for selecting a button operation mode, in accordance with the present invention. The controller monitors a signal line to detect button actuation, step 310. The timer is operated to detect the time period for the button actuation, step 320. When the time period is less than a predetermined threshold, the controller operates the radio communication device in execution mode by executing an associated pre-programmed function, steps 330, 340. When the time period is greater than the threshold, the controller operates the radio communication device in programming mode, steps 330, 350.

Figure 4:
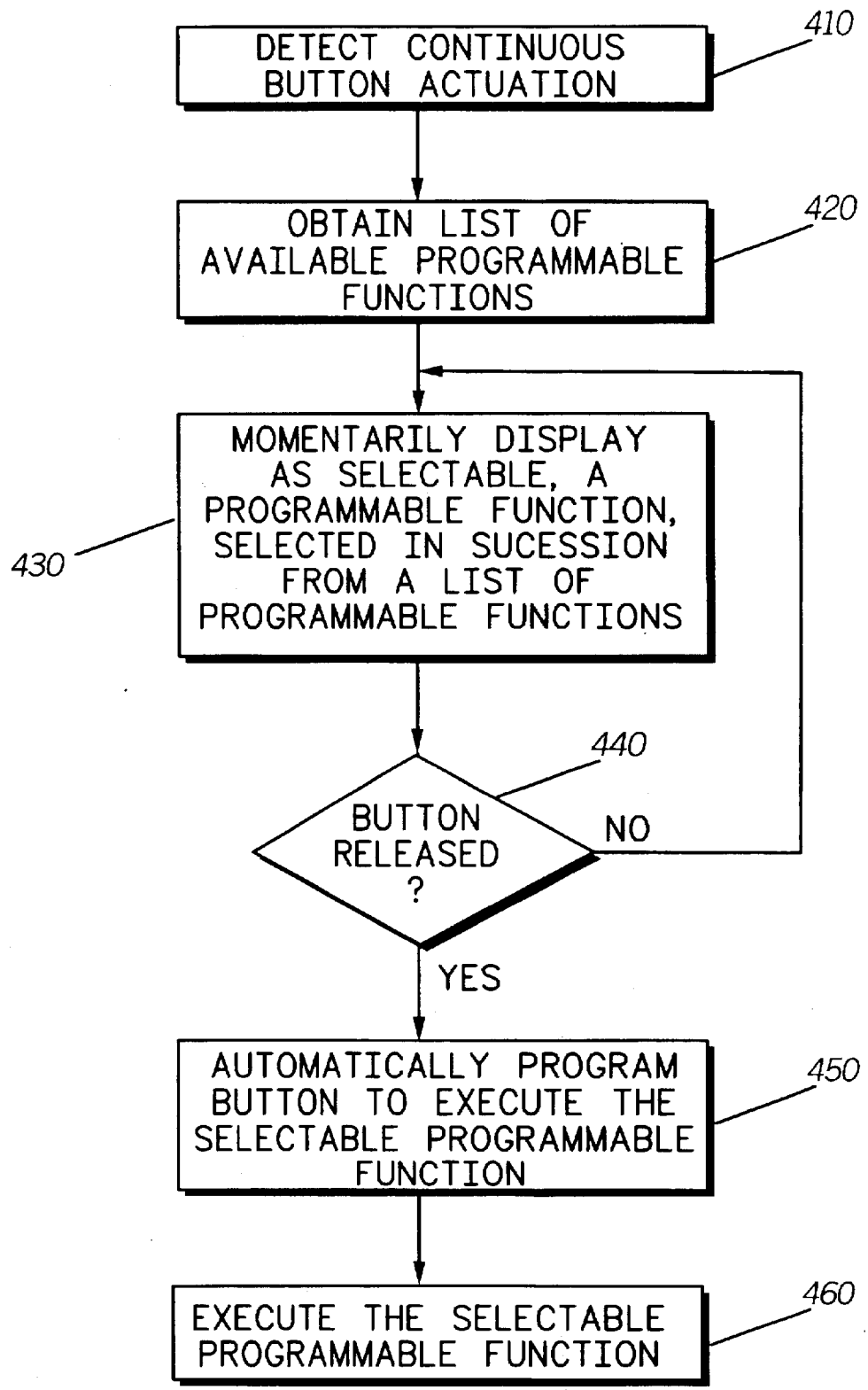
FIG. 4 is a flowchart of procedures for operation while in programming mode, in accordance with the present invention.

FIG. 4 is a flowchart of procedures summarizing operation of the radio communication device when the programmable button is in the programming mode, in accordance with the present invention. The controller detects continuous button actuation beyond the threshold time period, step 410. Subsequently, the controller obtains a list or set of available programmable functions from memory, step 420. The controller then momentarily displays, as selectable, a programmable function selected in succession from the set of programmable functions, step 430. A variety of techniques can be used to display a programmable function as selectable. For example, the selectable programmable function can be highlighted on the display for a short duration, such as two seconds, and if the button is not released during display of the selectable function, another function is presented on the display after expiration of the particular duration. Optionally, a number of available options may be simultaneously displayed and the selectable programmable function highlighted or otherwise indicated. When the button is released, the selectable function is automatically programmed to be associated with the button, when the button is in execution mode, step 450. In the preferred embodiment, release of the button also executes the selectable programmable function, step 460.

Figure 5:
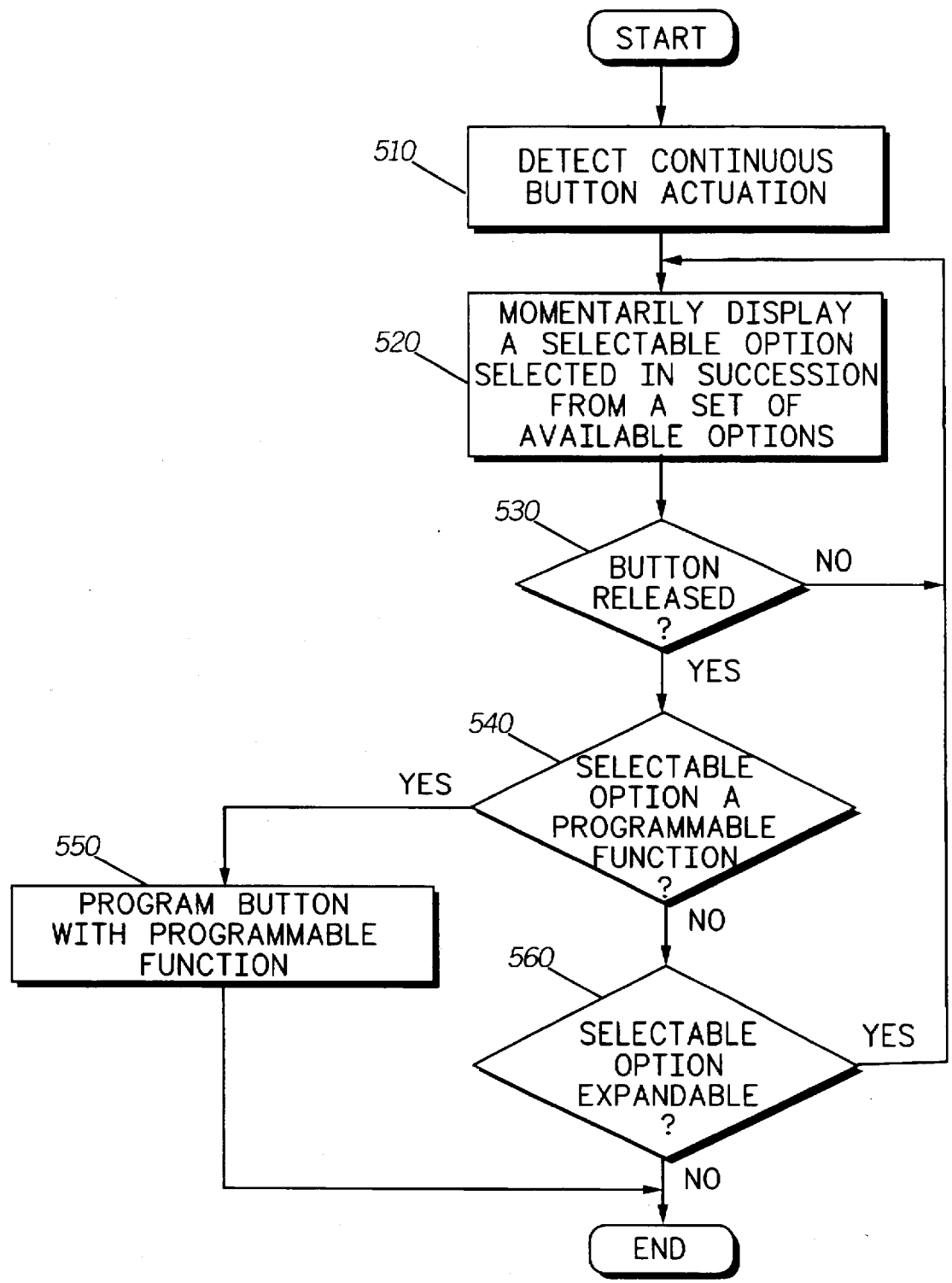
FIG. 5 is a flowchart of procedures summarizing an alternative mode of operation while in programming mode, in accordance with the present invention.

FIG. 5 is a flowchart of procedures summarizing an alternative operation of the display when the button is in programming mode. As before, the controller detects continuous button actuation when in programming mode, step 510. Continuous button actuation causes momentary display of a selectable option, which is selected in succession from a set of available of options, step 520. However, the selectable option may include expandable items as well as programmable functions. When the button is released and the selectable option is a programmable function, the button is programmed to execute the programmable function, steps 530, 540, 550. When the button is released and the selectable option is an expandable item, a new set of available options is obtained and these options momentarily displayed as before, steps 530, 540, 560, 520. Optionally, the radio communication device may be configured to automatically execute the programmable function upon the release of the button when the selectable option is a programmable function.

The present invention provides significant advantages over the prior art. With a one button operation, a user is able to associate a preprogrammed function with a button with relative ease of operation. There is no separate programming equipment required or cumbersome use of extra keypad entries in order to customize the programmable button. Yet, the user is able to associate the button with a wide variety of functions in an efficient and intuitive manner.

What is claimed is:

1. A radio communication device, comprising:
   a display; and
   a button having a first actuation mode when depressed for a first time period less than a particular threshold, and a second actuation mode when continuously depressed for a second time period greater than the particular threshold;
   wherein:
   when in the first actuation mode, the button causes execution of a preprogrammed function; and
   when in the second actuation mode, continuous depression of the button causes each of a plurality of programmable functions to be presented in succession as a selectable programmable function on the display, and release of the button automatically results in the button being programmed to cause execution of the selectable programmable function when the button is in the first actuation mode.

2. The communication device of claim 1, wherein when in the second actuation mode, release of the button causes automatic execution of the selectable programmable function.

3. The communication device of claim 2, wherein the selectable programmable function includes a transmit operation.

4. The communication device of claim 1, further comprising a non-volatile memory that stores the selectable programmable function as a preprogrammed function associated with the button.

5. The radio of claim 1, wherein the selectable programmable function, when executed, results in radio communication.

6. A radio communication device, comprising:
   a display; and
   a programmable button having an execution mode when activated for a first time period less than a particular threshold, and a programming mode when continuously activated for a second time period greater than the particular threshold;
   wherein:
   when in the execution mode, the button causes execution of a preprogrammed function; and
   when in the programming mode, continuous activation of the button causes a successive momentary presentation of each of a plurality of options as a selectable option on the display, and subsequent deactivation of the button automatically results in activation of the selectable option.

7. The communication device of claim 6, wherein the selectable option comprises a programmable function selected from a list of programmable functions.

8. The communication device of claim 7, wherein when in the programming mode, subsequent deactivation of the button automatically causes the button to be programmed with the programmable function for execution in the execution mode.

9. The communication device of claim 8, wherein the selectable programmable function includes a transmit operation.

10. A radio, comprising:
    a housing;
    a display mounted to the housing;
    a plurality of control buttons presented from the housing, the plurality of control buttons including a programmable button having an execution mode when engaged for a first time period less than a particular threshold, and a programming mode when continuously engaged for a second time period greater than the particular threshold;
    wherein:
    when in the execution mode, the programmable button causes execution of a preprogrammed function; and
    when in the programming mode, continuous engagement of the programmable button causes a successive momentary presentation of each of a plurality of programmable functions as a selectable programmable function on the display, and a subsequent disengagement of the programmable button automatically results in activation of the selectable programmable function.

11. The radio of claim 10, wherein the subsequent disengagement of the programmable button automatically programs the programmable button to execute the selectable programmable function when in the execution mode.

12. The radio of claim 11, wherein the selectable programmable function includes a transmit operation.

13. The radio of claim 10, wherein the selectable programmable function, when activated, results in radio communication.

14. In a radio communication device having a button that is programmable, and a display, a method comprising the steps of:

operating in a first mode, when the button is actuated for a first time period less than a particular threshold, and in a second mode, when the button is continuously actuated for a second time period greater than the particular threshold;

executing a preprogrammed function, when operating in the first mode;

executing button programming operations, when operating in the second mode, including the steps of:

momentarily displaying as selectable a programmable function selected in succession from a list of available programmable functions, while the button is being continuously actuated; and automatically programming the button to execute the programmable function for subsequent operation in the first mode, when actuation of the button is subsequently discontinued.

15. The method of claim 14, wherein the step of executing button programming operations, includes the step of automatically executing the programmable function, when actuation of the button is subsequently discontinued.

16. The method of claim 15, wherein the step of automatically executing the programmable function includes the step of executing a transmit function over a radio frequency channel.

17. The radio of claim 14, wherein the programmable function, when executed, results in radio communication.

* * * * *